(12) United States Patent
Zheng et al.

(10) Patent No.: US 11,445,746 B2
(45) Date of Patent: Sep. 20, 2022

(54) ROBOTIC ARM FOR SIMULATING CIGARETTE SMOKING PROCESS

(71) Applicant: CHINA TOBACCO YUNNAN INDUSTRIAL CO., LTD, Kunming (CN)

(72) Inventors: Han Zheng, Kunming (CN); Ying Zhang, Kunming (CN); Hao Wang, Kunming (CN); Jianbo Zhan, Kunming (CN); Zhenhua Yu, Kunming (CN); Jiao Xie, Kunming (CN); Xu Wang, Kunming (CN); Geng Li, Kunming (CN); Tao Wang, Kunming (CN); Tingting Yu, Kunming (CN); Liwei Li, Kunming (CN); Haiyan Ding, Kunming (CN); Baoshan Yue, Kunming (CN); Jiang Yu, Kunming (CN); Jing Zhang, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/414,329

(22) PCT Filed: Jan. 21, 2021

(86) PCT No.: PCT/CN2021/073107
§ 371 (c)(1),
(2) Date: Jun. 16, 2021

(87) PCT Pub. No.: WO2021/212937
PCT Pub. Date: Oct. 28, 2021

(65) Prior Publication Data
US 2022/0202066 A1  Jun. 30, 2022

(30) Foreign Application Priority Data

Apr. 20, 2020 (CN) .......................... 202010313947.3
Apr. 20, 2020 (CN) .......................... 202010329623.9

(51) Int. Cl.
*G01N 31/12* (2006.01)
*A24C 5/34* (2006.01)
*G01N 35/00* (2006.01)
*B25J 11/00* (2006.01)

(52) U.S. Cl.
CPC ............. *A24C 5/3406* (2013.01); *B25J 11/00* (2013.01); *G01N 35/0099* (2013.01)

(58) Field of Classification Search
CPC .. H04N 5/247; H04N 5/2256; G01N 35/0099; G01N 31/12; G01N 21/84;
(Continued)

(56) References Cited

U.S. PATENT DOCUMENTS 4,227,400 A * 10/1980 Nienow ................. G01B 11/02 73/796
5,377,697 A * 1/1995 Deutsch ................. A24C 5/343 73/78

(Continued)

FOREIGN PATENT DOCUMENTS

CN 103344780 A 10/2013
CN 103674761 A 3/2014
(Continued)

OTHER PUBLICATIONS

Sitt et al., A System for Automatic Quantification of Cigarette Smoking Behavior, 2006, IEEE, p. 4771-4774 (Year: 2006).*
(Continued)

*Primary Examiner* — McDieunel Marc
(74) *Attorney, Agent, or Firm* — Bayramoglu Law Offices LLC (57) ABSTRACT

A robotic arm includes a base, a first robotic arm, a second robotic arm, a robotic hand and a cigarette holder connected in sequence. The cigarette holder includes a cigarette insertion hole and a cigarette smoking tube. The cigarette smoking tube is connected to a smoking simulator. The robotic arm further includes at least one air exhausting hole. The air exhausting hole is located around the cigarette holder and
(Continued)

communicated with an air exhauster through an air exhausting pipe. The robotic arm swings to control the cigarette holder to carry a cigarette from a smoking position to an ash flicking position. Airflow is formed near the air exhausting hole by means of air exhaustion, so as to simulate influences of a wind speed in an outdoor environment on the columnar ash in the cigarette smoking process of the human body.

5 Claims, 9 Drawing Sheets

(58) Field of Classification Search
CPC ....... A24C 5/3406; B25J 15/00; B25J 9/1664; B25J 11/00
See application file for complete search history.

(56) References Cited

U.S. PATENT DOCUMENTS

| | | | | |
|---|---|---|---|---|
| 5,915,388 | A * | 6/1999 | Bowen | A24F 13/00 131/331 |
| 6,161,551 | A * | 12/2000 | Sakuma | A24C 5/3406 131/330 |
| 2016/0338408 | A1* | 11/2016 | Guenther, Jr. | B23P 19/027 |
| 2020/0068944 | A1 | 3/2020 | Ademe | |
| 2021/0243967 | A1* | 8/2021 | Bartrom | B25J 9/1697 |
| 2022/0142232 | A1* | 5/2022 | Zheng | G01N 31/12 |

FOREIGN PATENT DOCUMENTS

| | | |
|---|---|---|
| CN | 105651626 A | 6/2016 |
| CN | 207601050 U | 7/2018 |
| CN | 109911604 A | 6/2019 |
| CN | 111426788 A | 7/2020 |
| CN | 111426792 A | 7/2020 |
| DE | 102007059456 A1 | 6/2009 |

OTHER PUBLICATIONS

Spectrum.ieee.org, A robot that smodes, 2016, IEEE, p. 1 (Year: 2016).*

Lopez-Meyer et al., Monitoring of Cigarette Smoking Using Wearable Sensors and Support Vector Machines, 2013, IEEE, p. 1867-1872 (Year: 2013).*

Zhang et al., Irregular Cigarette Package Matching Algorithm Based on Palletizing System, 2018, IEEE, p. 274-278 (Year: 2018).*

* cited by examiner

| Sample number | Ash coagulation index (%) | |
|---|---|---|
| | Dynamic | Static |
| 1 | 98.3% | 96.4% |
| 2 | 98.1% | 96.2% |
| 3 | 98.8% | 97.0% |
| 4 | 97.6% | 95.6% |
| 5 | 97.0% | 96.1% |

ROBOTIC ARM FOR SIMULATING CIGARETTE SMOKING PROCESS

CROSS REFERENCE TO THE RELATED APPLICATIONS

This application is the national phase entry of International Application No. PCT/CN2021/073107, filed on Jan. 21, 2021, which is based upon and claims priority to Chinese Patent Application No. 202010329623.9, filed on Apr. 20, 2020, and Chinese Patent Application No. 202010313947.3, filed on Apr. 20, 2020, the entire contents of which are incorporated herein by reference.

TECHNICAL FIELD

The present invention relates to the field of cigarette smoking tests, and in particular, to a robotic arm for simulating a cigarette smoking process and a smoking environment of a human body and a simulation method thereof.

BACKGROUND

A cigarette may form columnar ash in a combustion process. According to differences in tobacco formulas, material formulas, physical indexes, or the like, the columnar ash of the cigarette may shrink to different degrees compared with the cigarette rod before combustion, and meanwhile, the columnar ash is likely to crack and split (splitting refers to a condition that an ash piece of the columnar ash generated by burning the tobacco is stripped from a columnar ash body and moved outwards). Ash integration of the cigarette is an important appearance form intuitively felt by a smoker in the combustion process of a cigarette product, and the smoker can evaluate the quality of the cigarette product by the ash integration effect. Meanwhile, in a process of smoking the cigarette, the ash of the cigarette drops and flies frequently, and a burning end falls off in severe cases, which pollutes the environment. Moreover, it is the main factor causing discomfort and dislike of the smoker and a passive smoker to the environment, and it may influence consumer loyalty to a cigarette brand and it even brings certain potential safety hazards.

The existing test equipment and technology for an ash integration sample generated by burning the cigarette mainly include a static combustion image analysis method, a smoking image analysis method, a CT scan method, or the like. In the prior art, a cigarette sample is typically placed at a fixed position for a test, but the test data fails to precisely reflect the performance and condition of the ash integration generated by burning the cigarette in an actual smoking process of the consumer. There are two reasons for this. On one hand, a combustion test using the static cigarette is unable to reflect a typical smoking action of a human body, that is, an arm swinging motion path of the human body from a smoking point to an ashtray in the smoking process is unable to be simulated. When the cigarette is moved in the combustion process, airflow has a great influence on the performance of the columnar ash of the cigarette. On the other hand, in the typical smoking process of the smoker, after taking a puff, the smoker holds the cigarette with one hand to the ashtray and flicks the ash away. This action is particularly critical to the test of the ash integration performance of the cigarette, and therefore, static measurement is unable to accurately reflect the advantages and disadvantages of the tested sample when applied to production and consumption. In addition, people often smoke the cigarette outdoors, so a wind speed has a great influence on the columnar ash. The static combustion test is often conducted indoors, where the environment is relatively stable. Therefore, it is particularly important to simulate the smoking environment, so as to achieve a realistic simulation of the actual cigarette smoking action of the human body.

The present invention is proposed to solve the above problems.

SUMMARY

The present invention aims to solve the defects of an existing static combustion test method, and provides a robotic arm for simulating a cigarette smoking process and a smoking environment of a human body, including: a base, a first robotic arm, a second robotic arm, a robotic hand and a cigarette holder connected in sequence. The cigarette holder includes a cigarette insertion hole and a cigarette smoking tube connected to a smoking simulator. The robotic arm further includes at least one air exhausting hole located around the cigarette holder and communicated with an air exhauster through an air exhausting pipe.

Preferably, a first joint is provided between the base and a rotating table, a second joint is provided between the rotating table and the first robotic arm, a third joint is provided between the first and second robotic arms, and a fourth joint is provided between the second robotic arm and the robotic hand.

The second joint, the third joint and a fifth joint each employ a hinged connection, and the first joint and the fourth joint each employ a rotatable connection.

The rotating table is rotated relative to the base along a plane of the first joint, and the robotic hand is rotated relative to the first robotic arm along a plane of the fourth joint, so as to simulate actions of a shoulder, an elbow and a wrist of a smoker in a real smoking process. In a typical smoking process of a smoker, after taking a puff, the smoker holds a cigarette with one hand, swings one arm with the elbow as a center, the mouth as a starting point and an ashtray as an end point, then overturns the wrist with the wrist joint as a center after reaching the ashtray or while swinging the arm, and finally flicks the cigarette ash away.

Preferably, the air exhausting hole is provided with a filter screen for filtering the cigarette ash while smoke is exhausted.

Preferably, the robotic arm further includes an ash flicking mechanism. The ash flicking mechanism includes a support and a flicking piece and is fixed at the cigarette holder or placed at a working table independently.

In a second aspect, the present invention provides a method for simulating a cigarette smoking process and a smoking environment of a human body based on the robotic arm, specifically including the following steps:

(1) lighting a cigarette, setting a smoking mode of the smoking simulator, and starting a smoking action; meanwhile or then, (2) starting the robotic arm and setting control parameters, and swinging the robotic arm to enable the cigarette holder to carry the cigarette from a smoking position to an ash flicking position;

(3) after the cigarette reaches the ash flicking position, enabling the flicking piece to tap the cigarette to flick ash away, and after the ash is flicked, swinging the robotic arm to enable the cigarette holder to carry the cigarette from the ash flicking position to the smoking position, so as to finish one smoking action; and (4) repeating steps (2) to (3) to perform a plurality of smoking actions.

Preferably, in step (2), when the cigarette holder swings to carry the cigarette from the smoking position to the ash flicking position, the robotic arm reaches a staying position and stays for a period of time, so as to simulate a cigarette static state when the ash flicking action is not performed after a smoking action of the human body.

A height from the smoking position to a bottom of the base is a first height. A height from the staying position to the bottom of the base is a second height. A height from the ash flicking position to the bottom of the base is a third height. The first height is larger than the second height, and the second height is larger than the third height.

Preferably, an air exhausting speed of the air exhauster in step (1) is less than 10 m/s and not equal to 0 m/s.

Preferably, the smoking mode of the smoking simulator in step (1) is an International Organization of Standardization (ISO) or Federal Trade Commission (FTC) or Massachusetts smoking mode.

Compared with the prior art, the present invention has the following advantages.

1. The robotic arm according to the present invention includes the ash flicking mechanism. The ash flicking mechanism includes the support and the flicking piece and is fixed at the cigarette holder or placed independently. After the cigarette holder carries the cigarette from the smoking position to the ash flicking position, the cigarette is tapped by the flicking piece to flick the ash away, such that the cigarette smoking process of the human body is simulated more realistically.

2 The robotic arm according to the present invention swings to control the cigarette holder to carry the cigarette from the smoking position to the ash flicking position. In the typical smoking process of the smoker, after taking one puff, the smoker holds the cigarette with one hand, swings one arm with the elbow as the center, the mouth as the starting point and the ashtray as the end point, then the smoker overturns the wrist with the wrist joint as the center after reaching the ashtray or while swinging the arm, and finally flicks the cigarette ash away. The robotic arm according to the present invention more realistically simulates influences of airflow on the columnar ash of the cigarette when the cigarette is moving in a combustion process.

3. The robotic arm according to the present invention further includes at least one air exhausting hole located around the cigarette holder and communicated with the air exhauster through the air exhausting pipe. The air exhausting hole communicated with the air exhauster is configured to exhaust air, which has the following functions: (1) the smoke generated by cigarette combustion is exhausted; and (2) airflow is formed near the air exhausting hole by means of air exhaustion, and the air exhausting speed of the air exhauster is regulated to simulate the influence of wind on the columnar ash in an outdoor environment during the actual cigarette smoking action of the human body. Moreover, the air exhausting hole is provided with the filter screen, such that the cigarette ash may be filtered while the smoke is exhausted.

4. In a preferred implementation of the present invention, when the cigarette holder swings to carry the cigarette from the smoking position to the ash flicking position, the robotic arm reaches the staying position and stays for a period of time, so as to simulate the cigarette static state when the ash flicking action is not performed after the smoking action of the human body.

5. The robotic arm according to the present invention simulates a motion path of the smoker when smoking the cigarette, which keeps the simulated action paths consistent, and effectively improves the precision of the ash integration characteristics test of the combusted cigarette.

1—base, 2—rotating table, 3—first robotic arm, 4—second robotic arm, 5—robotic hand, 6—cigarette holder, 7—ash flicking mechanism, 8—air exhausting hole, 9—filter screen, 11—first joint, 22—second joint, 33—third joint, 44—fourth joint, 55—fifth joint, 61—cigarette insertion hole, 62—cigarette smoking tube, 71—flicking piece, and 72—support of flicking piece.

DETAILED DESCRIPTION OF THE EMBODIMENTS

Embodiment 1

In the embodiment, the robotic arm according to the present invention is configured to simulate a real cigarette smoking environment and a smoking process of a human body, so as to more accurately test an ash integration performance of a cigarette in the cigarette smoking process. A specific test process is as follows:

(1) lighting a cigarette, setting a smoking mode of the smoking simulator, and starting a smoking action; meanwhile or then, (2) starting the robotic arm and setting control parameters, and swinging the robotic arm to enable the cigarette holder 6 to carry the cigarette from a smoking position to an ash flicking position;

(3) after the cigarette reaches the ash flicking position, enabling the flicking piece 71 to tap the cigarette to flick ash away, and after the ash is flicked, swinging the robotic arm to enable the cigarette holder 6 to carry the cigarette from the ash flicking position to the smoking position, so as to finish one smoking action; and (4) repeating steps (2) to (3) to perform a plurality of smoking actions.

In step (2), when the cigarette holder 6 swings to carry the cigarette from the smoking position to the ash flicking position, the robotic arm reaches a staying position and stays for a period of time, so as to simulate a cigarette static state when the ash flicking action is not performed after a smoking action of the human body.

A height from the smoking position to a bottom of the base 1 is a first height. A height from the staying position to the bottom of the base 1 is a second height. A height from the ash flicking position to the bottom of the base 1 is a third height. The first height is larger than the second height, and the second height is larger than the third height.

In step (1), the smoking mode of the smoking simulator is a Federal Trade Commission (FTC) smoking mode.

Figure 1:
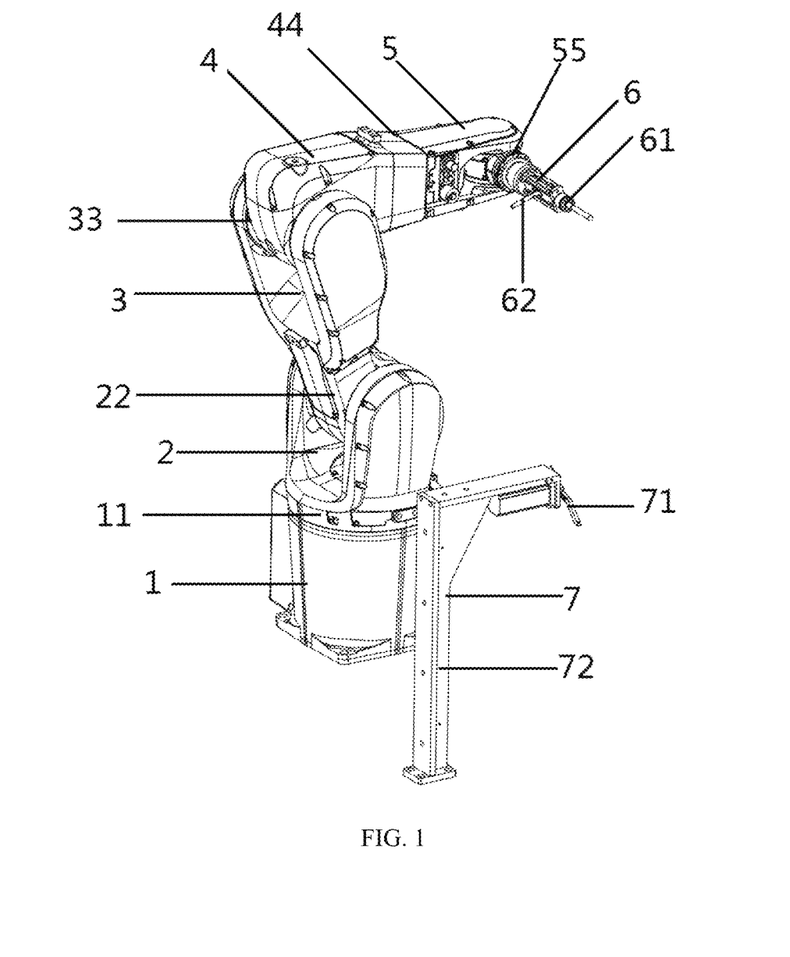
FIG. 1 is a schematic diagram of a robotic arm at a smoking position according to a first embodiment of the present invention.
Figure 2:
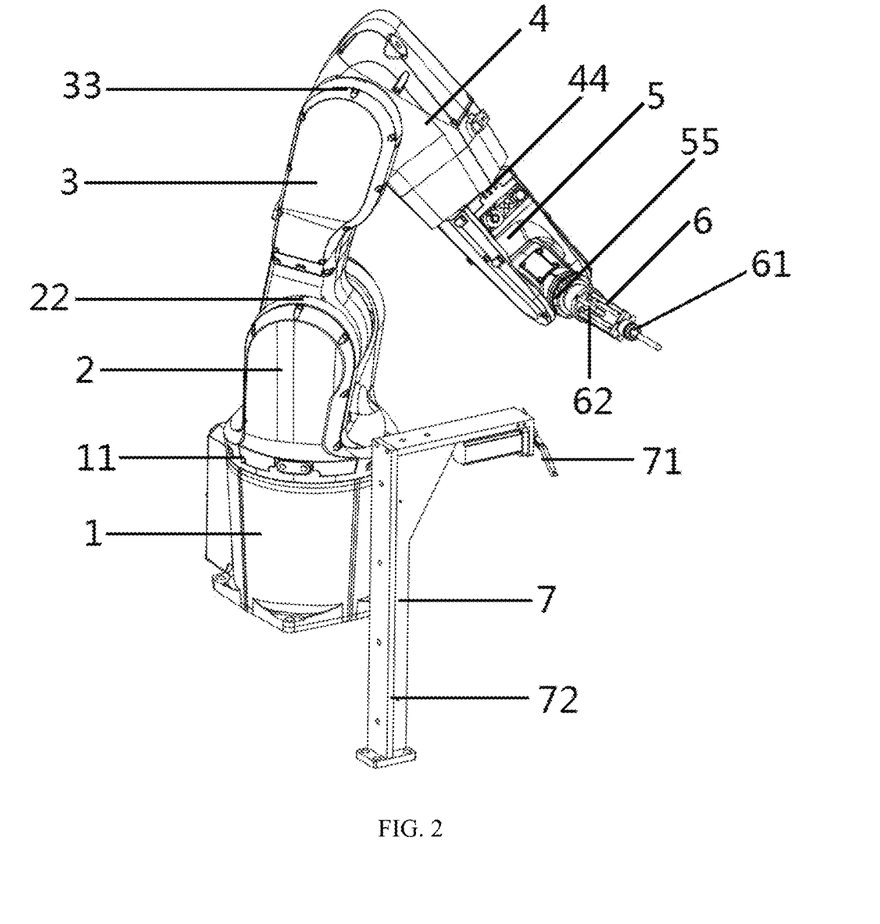
FIG. 2 is a schematic diagram of the robotic arm at a staying position according to the first embodiment of the present invention.
Figure 3:
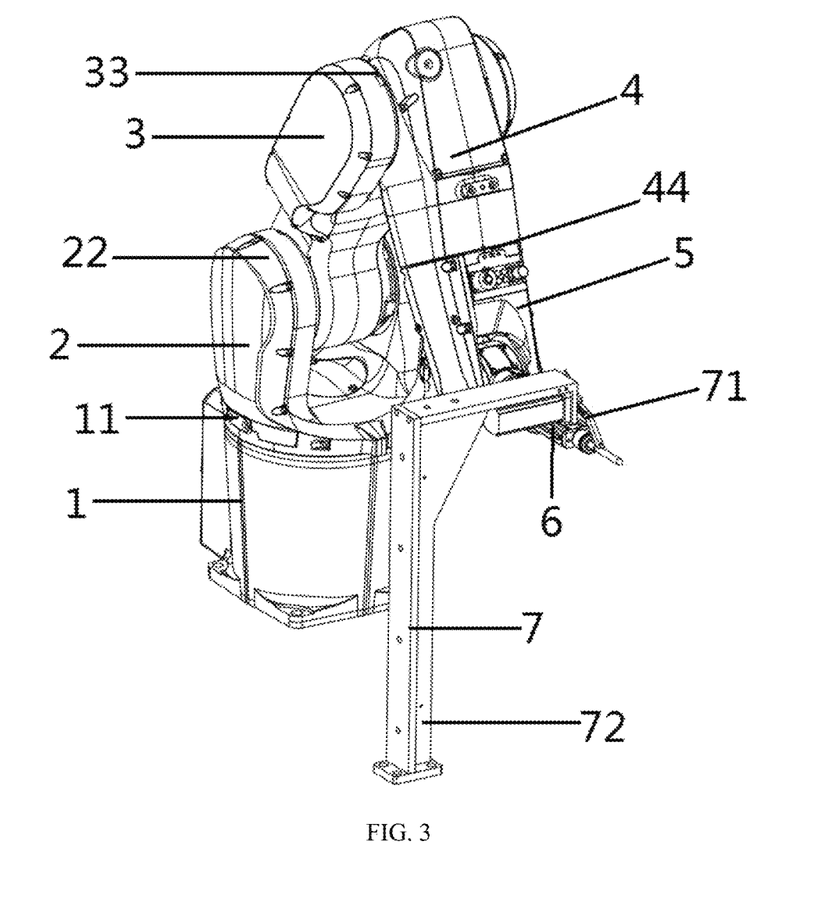
FIG. 3 is a schematic diagram of the robotic arm at an ash flicking position according to the first embodiment of the present invention.
Figure 4:
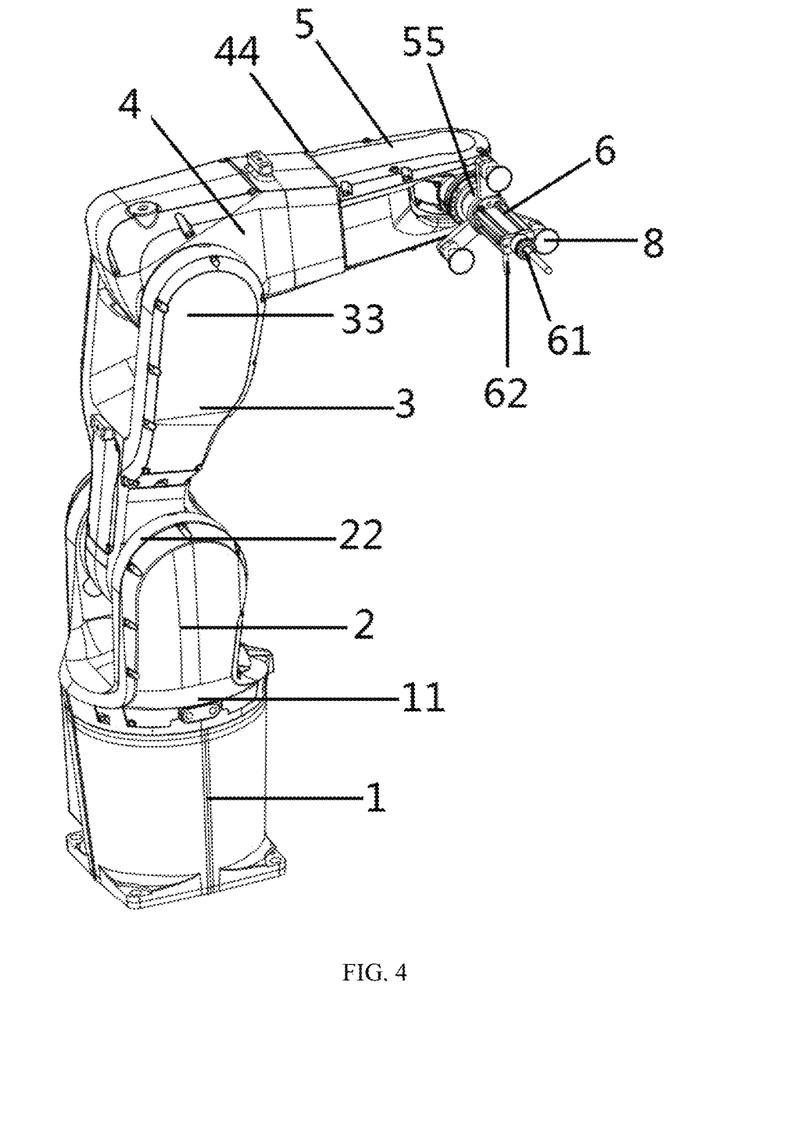
FIG. 4 is a schematic diagram of a robotic arm at a smoking position according to a second embodiment of the present invention.
Figure 5:
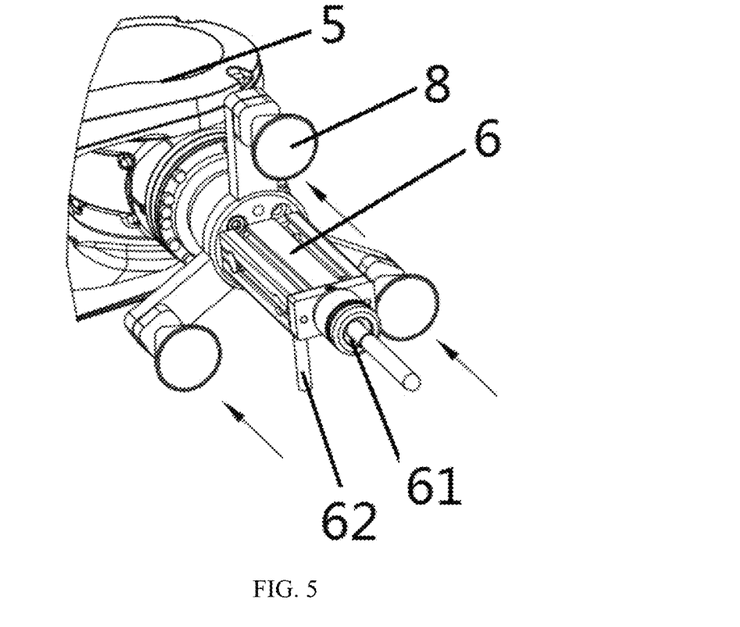
FIG. 5 is a schematic structural diagram of an air exhausting hole 8 of the robotic arm according to the second embodiment of the present invention.
Figure 6:
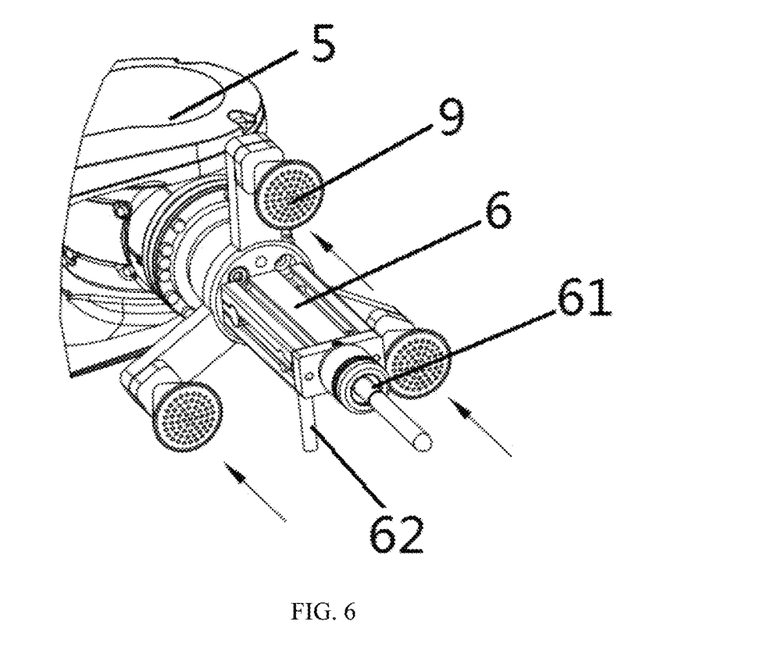
FIG. 6 is a schematic structural diagram of the air exhausting hole 8 of the robotic arm according to the second embodiment of the present invention.
Figure 7:
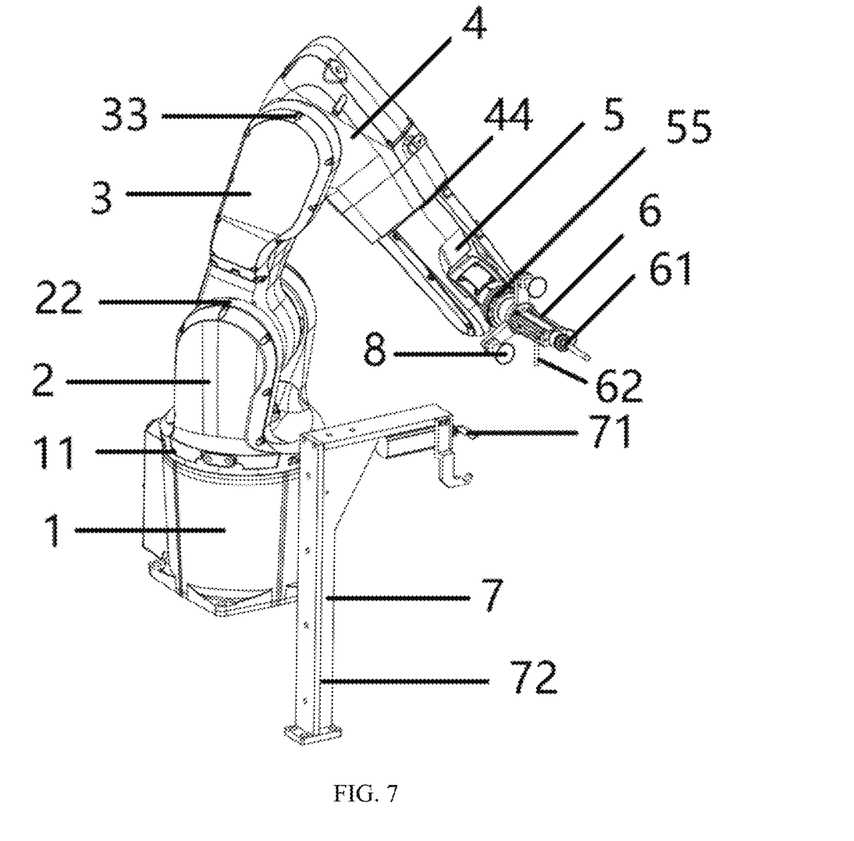
FIG. 7 is a schematic diagram of the robotic arm at a staying position according to the second embodiment of the present invention.
Figure 8:
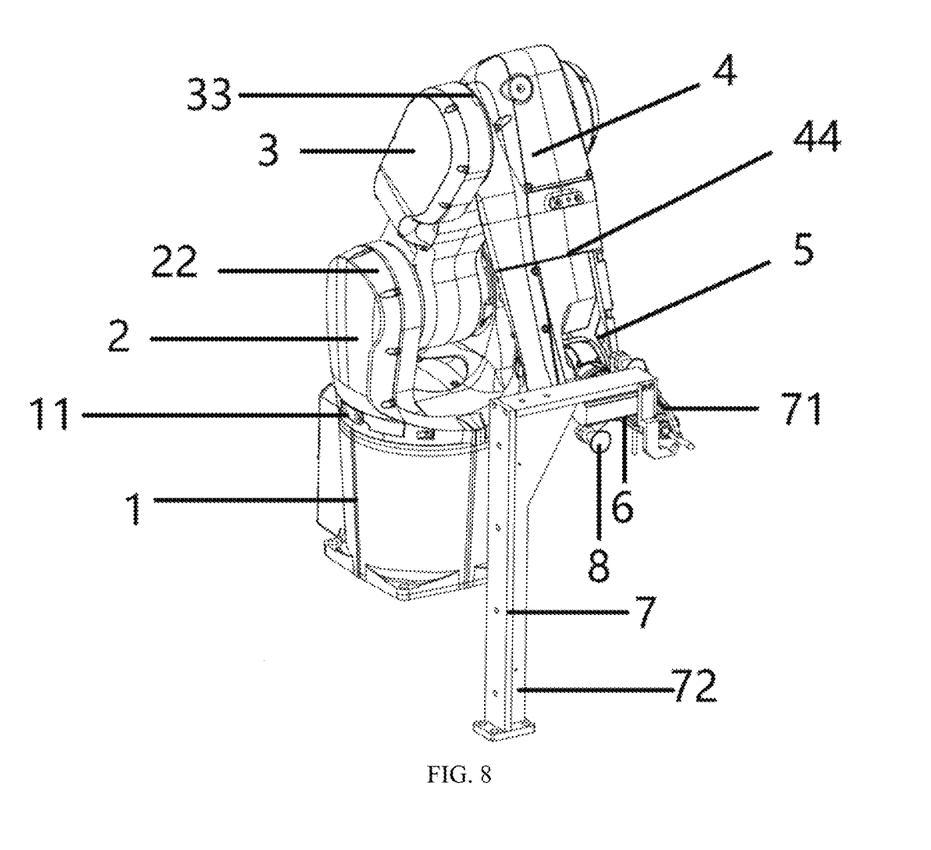
FIG. 8 is a schematic diagram of the robotic arm at an ash flicking position according to the second embodiment of the present invention.
Figure 9:
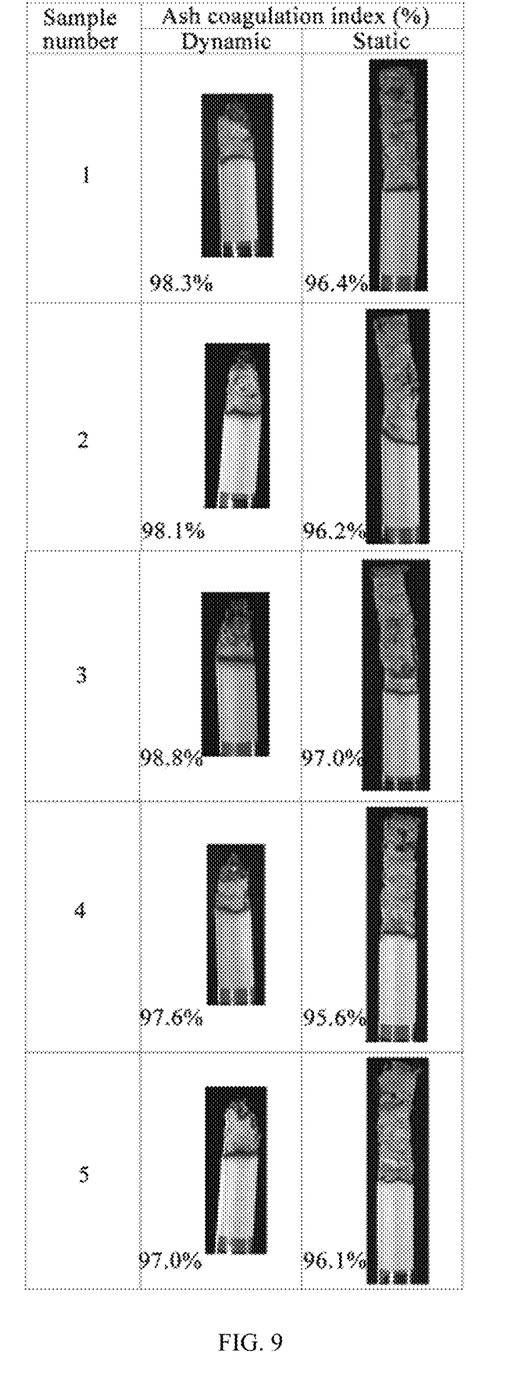
FIG. 9 shows corresponding image acquisition results when a set acquisition combustion length is reached.

Two groups of cigarette samples 1-5 of the same batches (the samples 1 in the two groups belong to the same batch, but the sample 1 and the samples 2-5 do not belong to the same batch) are selected. The dynamic smoking process and a static smoking process according to the present invention are simulated, respectively. The images of the tested samples are recorded and analyzed in real time in the smoking process. The test is finished after the tested sample reaches a set acquisition combustion length, and then an average value of index data within the acquisition combustion length serves as a test result of an index of the sample. Table 1 shows test results of an ash coagulation index of a cigarette sample under different conditions when the acquisition combustion length is set to be 30 mm. FIG. 9 shows corresponding image acquisition results when the set acquisition combustion length is reached.

The cigarette combustion ash coagulation index AI is calculated by:

$$AI = \left(1 - \frac{S_r}{S_t}\right) \times 100\%;$$

wherein $S_r$ is an area of a crack part of the columnar ash; and $S_t$ is a total area of the columnar ash.

The cigarette combustion ash coagulation index AI of the cigarette to be tested is an average value calculated by the images acquired from a plurality of cameras.

TABLE 1 test results of cigarettes ash coagulation indexes under different conditions

| | Ash coagulation index (%) | |
|---|---|---|
| Sample number | Simulated dynamic smoking | Static smoking |
| 1 | 98.3% | 96.4% |
| 2 | 98.1% | 96.2% |
| 3 | 98.8% | 97.0% |
| 4 | 97.6% | 95.6% |
| 5 | 97.0% | 96.1% |

According to the test results of FIG. 9, in the simulated smoking process of the human body, part of the images are acquired after the cigarette ash is flicked, and image comparison is performed on burning ends of the cigarettes in an image processing process. The part of the images in which the burning ends do not generate falling ash in an actual smoking process is eliminated. Therefore, for the same batch of samples, the simulated dynamic smoking process has a higher ash coagulation index than the static smoking process. In the real smoking process, when a smoker swings one arm to move the cigarette, the airflow certainly influences the columnar ash of the cigarette. Therefore, the cigarette ash coagulation index of the simulated dynamic smoking process in the present embodiment has a reference value for researching the cigarette ash coagulation index of the real smoking process.

Embodiment 2

In the embodiment, the robotic arm according to the present invention is configured to simulate a real cigarette smoking environment and a smoking process of a human body, so as to more accurately test an ash integration performance of a cigarette in the cigarette smoking process. A specific test process is as follows:

(1) lighting a cigarette, setting a smoking mode of the smoking simulator to start a smoking action, and starting the air exhauster; meanwhile or then, (2) starting the robotic arm and setting control parameters, and swinging the robotic arm to enable the cigarette holder 6 to carry the cigarette from a smoking position to an ash flicking position;

(3) after the cigarette reaches the ash flicking position, enabling the flicking piece 71 to tap the cigarette to flick ash away, and after the ash is flicked, swinging the robotic arm to enable the cigarette holder 6 to carry the cigarette from the ash flicking position to the smoking position, so as to finish one smoking action; and (4) repeating steps (2) to (3) to perform a plurality of smoking actions.

In step (2), when the cigarette holder 6 swings to carry the cigarette from the smoking position to the ash flicking position, the robotic arm reaches a staying position and stays for a period of time, so as to simulate a cigarette static state when the ash flicking action is not performed after a smoking action of the human body.

A height from the smoking position to a bottom of the base 1 is a first height. A height from the staying position to the bottom of the base 1 is a second height. A height from the ash flicking position to the bottom of the base 1 is a third height. The first height is larger than the second height, and the second height is larger than the third height.

In step (1), the air exhauster has air exhausting speeds of 0 m/s, 2 m/s and 4 m/s, respectively.

In step (1), the smoking mode of the smoking simulator is an International Organization of Standardization (ISO) smoking mode.

Figure 10:
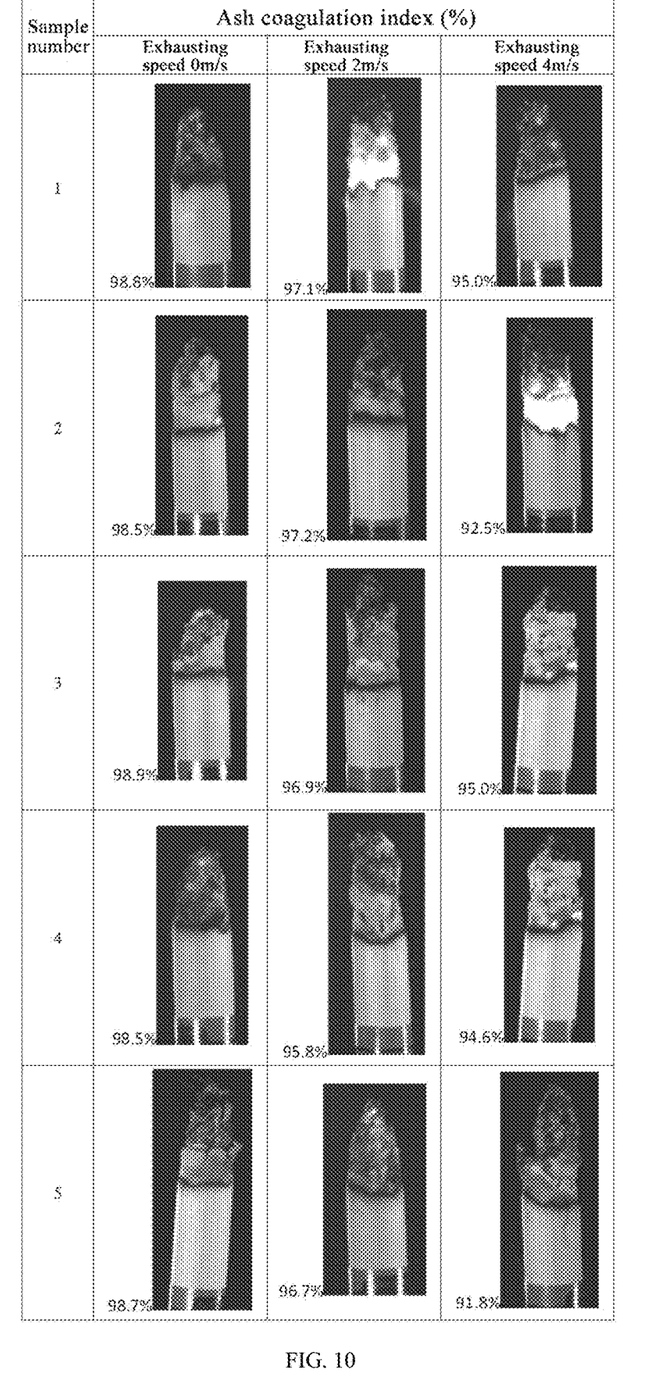
FIG. 10 shows corresponding image acquisition results when a set acquisition combustion length is reached.

Two groups of cigarette samples 1-5 of the same batches (the samples 1 in the two groups belong to the same batch, but the sample 1 and the samples 2-5 do not belong to the same batch) are selected. The simulated dynamic smoking process according to the present invention at the air exhausting speeds of 0 m/s, 2 m/s and 4 m/s is simulated respectively. The images of the tested samples are recorded and analyzed in real time in the smoking process, the test is finished after the tested sample reaches a set acquisition combustion length, and then an average value of index data within the acquisition combustion length serves as a test result of an index of the sample. Table 2 shows test results of an ash coagulation index of a cigarette sample under different conditions when the acquisition combustion length is set to be 35 mm. FIG. 10 shows corresponding image acquisition results when the sample is tested to reach the set acquisition combustion length.

The cigarette combustion ash coagulation index AI is calculated by:

$$AI = \left(1 - \frac{S_r}{S_t}\right) \times 100\%;$$

wherein $S_r$ is an area of a crack part of the columnar ash; and $S_t$ is a total area of the columnar ash.

The cigarette combustion ash coagulation index AI of the cigarette to be tested is an average value calculated by the images acquired from a plurality of cameras.

TABLE 2 test results of ash coagulation indexes of cigarettes under different conditions

| | Ash coagulation index (%) | | |
|---|---|---|---|
| Sample number | Air exhausting speed 0 m/s | Air exhausting speed 2 m/s | Air exhausting speed 4 m/s |
| 1 | 98.8% | 97.1% | 95.0% |
| 2 | 98.5% | 97.2% | 92.5% |
| 3 | 98.9% | 96.9% | 95.0% |
| 4 | 98.5% | 95.8% | 94.6% |
| 5 | 98.7% | 96.7% | 91.8% |

According to table 2 and FIG. 10, the ash coagulation indexes of cigarette samples 1-5 are all decreased to different degrees along with an increase of the air exhausting speed, which further indicates that influences of wind in an outdoor environment on the columnar ash are not negligible in the real smoking process. In the present embodiment, the airflow is formed near the air exhausting hole 8 by means of air exhaustion, and the air exhausting speed of the air exhauster is regulated to simulate the influences of the wind in the outdoor environment on the columnar ash in the real cigarette smoking process of the human body. In the present embodiment, when the air exhausting speed is 2 m/s or 4 m/s, the cigarette ash coagulation indexes have a reference value for researching the cigarette ash coagulation index in the real smoking process. Therefore, the cigarette ash coagulation performance of cigarette samples 1, 3, and 4 is better than the cigarette ash coagulation performance of cigarette samples 2 and 5 under the real outdoor smoking condition with the wind in the present embodiment.

What is claimed is:

1. A method for simulating a cigarette smoking process and a smoking environment of a human body based on a robotic arm, wherein the robotic arm comprises a base, a first robotic arm, a second robotic arm, a robotic hand and a cigarette holder, wherein the base, the first robotic arm, the second robotic arm, the robotic hand and the cigarette holder are connected in sequence;

the cigarette holder comprises a cigarette insertion hole and a cigarette smoking tube, and the cigarette smoking tube is connected to a smoking simulator;

the robotic arm further comprises at least one air exhausting hole, the at least one air exhausting hole is located around the cigarette holder, and the at least one air exhausting hole is communicated with an air exhauster through an air exhausting pipe; and the robotic arm further comprises an ash flicking mechanism, the ash flicking mechanism comprises a support and a flicking piece and the ash flicking mechanism is fixed at the cigarette holder or placed at a working table independently;

the method comprises the following steps:

(1) lighting a cigarette, setting a smoking mode of the smoking simulator to start a smoking action, and starting the air exhauster; meanwhile or then, (2) starting the robotic arm and setting control parameters, and swinging the robotic arm to enable the cigarette holder to carry the cigarette from a smoking position to an ash flicking position;

(3) after the cigarette reaches the ash flicking position, enabling the flicking piece to tap the cigarette to flick ash away, and after the ash is flicked, swinging the robotic arm to enable the cigarette holder to carry the cigarette from the ash flicking position to the smoking position, so as to finish one smoking action; and (4) repeating steps (2) to (3) to perform a plurality of smoking actions.

2. The method according to claim 1, wherein in step (2), when the cigarette holder swings to carry the cigarette from the smoking position to the ash flicking position, the robotic arm passes through a staying position.

3. The method according to claim 2, wherein a height from the smoking position to a bottom of the base is a first height, a height from the staying position to the bottom of the base is a second height, a height from the ash flicking position to the bottom of the base is a third height, the first height is larger than the second height, and the second height is larger than the third height.

4. The method according to claim 1, wherein an air exhausting speed of the air exhauster in step (1) is less than 10 m/s and not equal to 0 m/s.

5. The method according to claim 1, wherein the smoking mode of the smoking simulator in step (1) is an International Organization of Standardization (ISO) or Federal Trade Commission (FTC) or Massachusetts smoking mode.

* * * * *